United States Patent [19]

Fornerod et al.

[11] Patent Number: 4,772,801
[45] Date of Patent: Sep. 20, 1988

[54] OPTICAL LIGHT BEAM DEVICE FOR AUTOMATICALLY CONTROLLING THE BENDING OPERATION WHEN BENDING WITH A PRESS BRAKE

[75] Inventors: André Fornerod, Yverdon; Jean-Pierre Gallandre, Buchillon; Pierre Ravussin, Lausanne, all of Switzerland

[73] Assignee: Cybelec S.A., Yverdon, Switzerland

[21] Appl. No.: 925,071

[22] Filed: Oct. 30, 1986

[30] Foreign Application Priority Data

Oct. 30, 1985 [CH] Switzerland .......................... 4655/85

[51] Int. Cl.$^4$ ....................... G01B 11/00; G01N 21/86
[52] U.S. Cl. ........................................ 250/561; 356/394
[58] Field of Search ................... 250/560, 561; 72/10, 72/30, 31, 37, 389; 356/392, 393, 394, 376; 358/101

[56] References Cited

U.S. PATENT DOCUMENTS

| | | | |
|---|---|---|---|
| 4,166,369 | 9/1979 | Nakajima | 72/389 |
| 4,340,326 | 7/1982 | Buonauro et al. | 250/561 |
| 4,523,850 | 6/1985 | Covey et al. | 250/561 |
| 4,564,765 | 1/1986 | Blaich | 72/37 |

OTHER PUBLICATIONS

Abstract of Japanese Publication No. 59-160707 (11/9/84).
Abstract of Japanese Publication No. 59-160708 (11/9/84).

Primary Examiner—David C. Nelms
Assistant Examiner—Stephone B. Allen
Attorney, Agent, or Firm—Cushman, Darby & Cushman

[57] ABSTRACT

An optical light beam device for automatically controlling the bending operation when bending with a press brake, comprising an emitter (1), mounted on one side of the press, adapted to produce a large-diameter light beam (8), directed parallel to the bending axis of the workpiece to be bent, and a receiver (4) comprising a box (11) including a screen (14) drilled with a plurality of holes (15) arranged to forming a plurality of light beams (16) of small diameters. The box (11) comprises a deflecting means (17) intended to deflecting the light beams (16) on to a system of photodiodes (18) arranged on the axis of rotation (19) of a rotating motor (12) fast with the box (11) and with an angle coder (13). A microordinator is connected to the photodiodes (18) and to the angle coder (13) and permits the determination of the instantaneous bending angle of the workpiece and the control of the descent of the punch.

10 Claims, 5 Drawing Sheets

OPTICAL LIGHT BEAM DEVICE FOR AUTOMATICALLY CONTROLLING THE BENDING OPERATION WHEN BENDING WITH A PRESS BRAKE

FIELD OF THE INVENTION

The invention relates to an optical light beam device for automatically controlling the bending operation when bending with a press brake.

BACKGROUND OF THE INVENTION

When bending in the open, using press brakes, especially when bending metal sheets, the accuracy of the bending angle which is obtained depends, firstly, on the characteristics of the sheet, such as its thickness, which may vary from one sheet to another, and its physical and geometrical characteristics, on which the elastic return of the sheets depends, and secondly on characteristics of the press itself, especially tolerances in the construction of the machine and the tooling and wear on the tools, and also deformations appearing in the press at the instant of bending.

The majority of the press brakes which are at present in use necessitate a manual adjustment of the press before the bending and/or during the bending.

An optical safety device for press brakes is known from U.S. Pat. No. 4,166,369. The said device comprises a plurality of light projectors mounted on one side of the press and forming a plurality of horizontal light beams received on a plurality of light receivers mounted on the other side of the press, and being adapted to stop the operation of the press brake when any of said light beams are interrupted by an operator's hand or finger. The only function of said device is safety. Determination of bending angle of the workpiece to be bent is not possible with said device.

Optical means for detecting a bending angle of the work are known from both Japanese patent applications Nos. 59 160707 and 59 160708, using the light reflected of a light beam projected perpendicularly against the one part of the workpiece. Such means only permit the local measure of the bending angle, but variations of the bending angle along the workpiece cannot be detected. Furthermore, said means are ineffective in case of asymmetric bending.

SUMMARY OF THE INVENTION

The object of the present invention is to propose an optical light beam device which permits instantaneous automatic control of the bending operation in respect of the part to be bent, so as to obtain, automatically and exactly, the bending angle which is desired, while avoiding any manual intervention before and during the bending, such device being able to be adapted in a simple manner to all types of presses, whether they are of old or recent construction.

To this end, the present invention is concerned with an optical light beam device for automatically controlling the bending operation when bending with a press brake, such as defined in the claims.

BRIEF DESCRIPTION OF THE DRAWINGS

The invention will be better understood by means of the description which follows, this being given by way of example and being related to the drawings, in which.

DETAILED DESCRIPTION OF THE INVENTION

Figure 1:
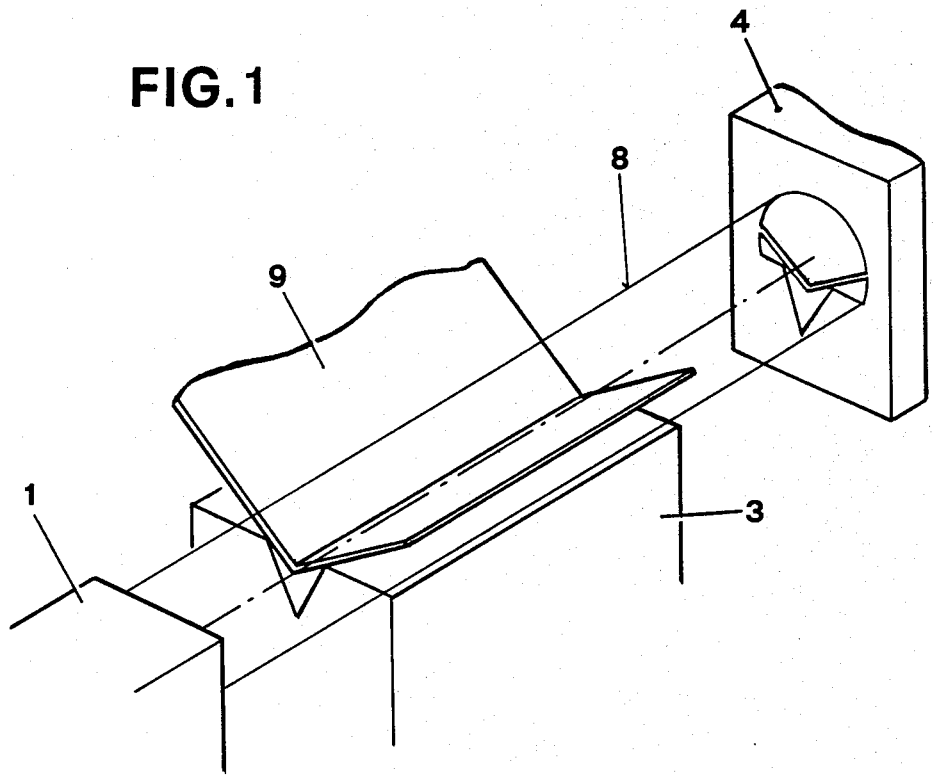
FIG. 1 is a diagrammatic perspective view showing the device according to the invention in the operating position.

As shown in FIG. 1, the device comprises an emitter 1 provided with a light source and fast with the lower table of the press 2 and disposed at one end of the press, and a receiver 4 fast with the lower table and disposed at the other end of this latter.

Figure 2:
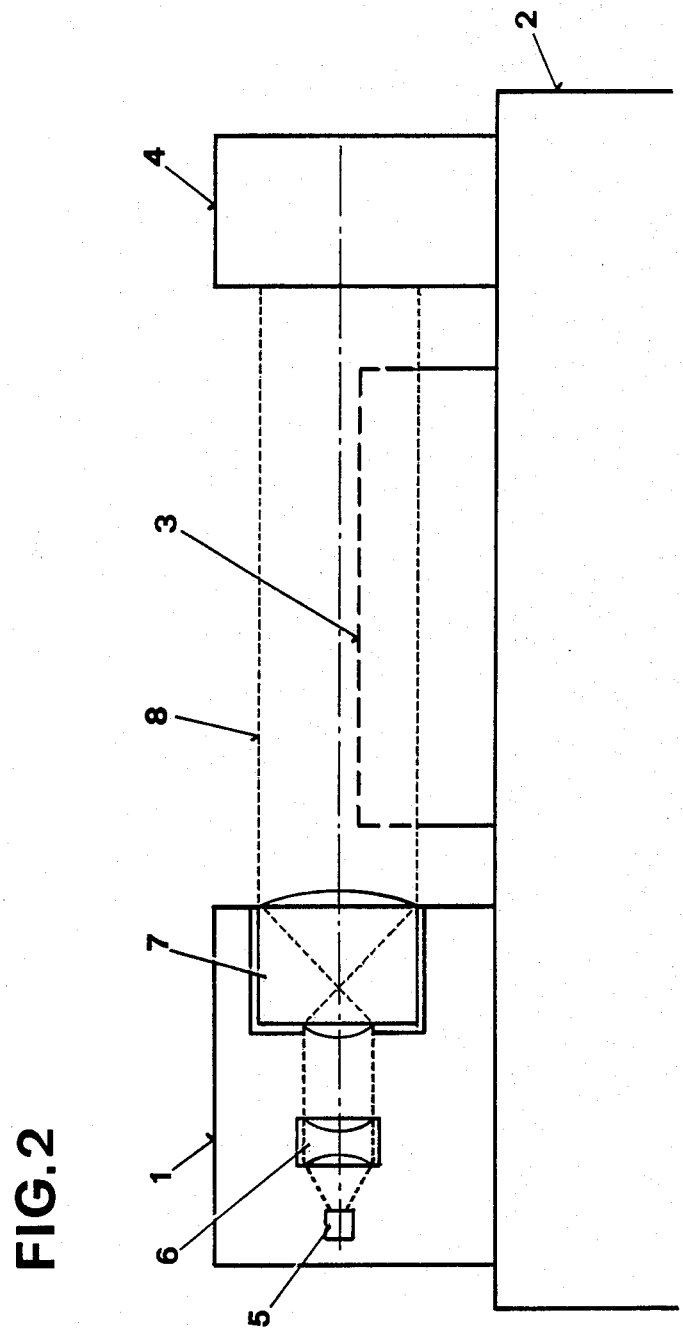
FIG. 2 is a diagrammatic longitudinal view, partly in section, of a first modified form of the arrangement according to the invention.
Figure 3:
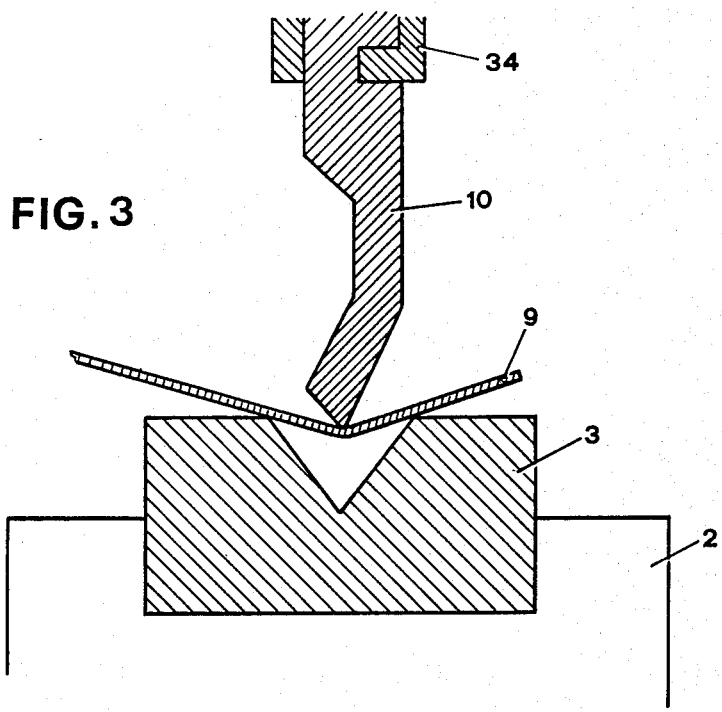
FIG. 3 is a diagrammatic transverse vertical section of a press at the time of bending.
Figure 5:
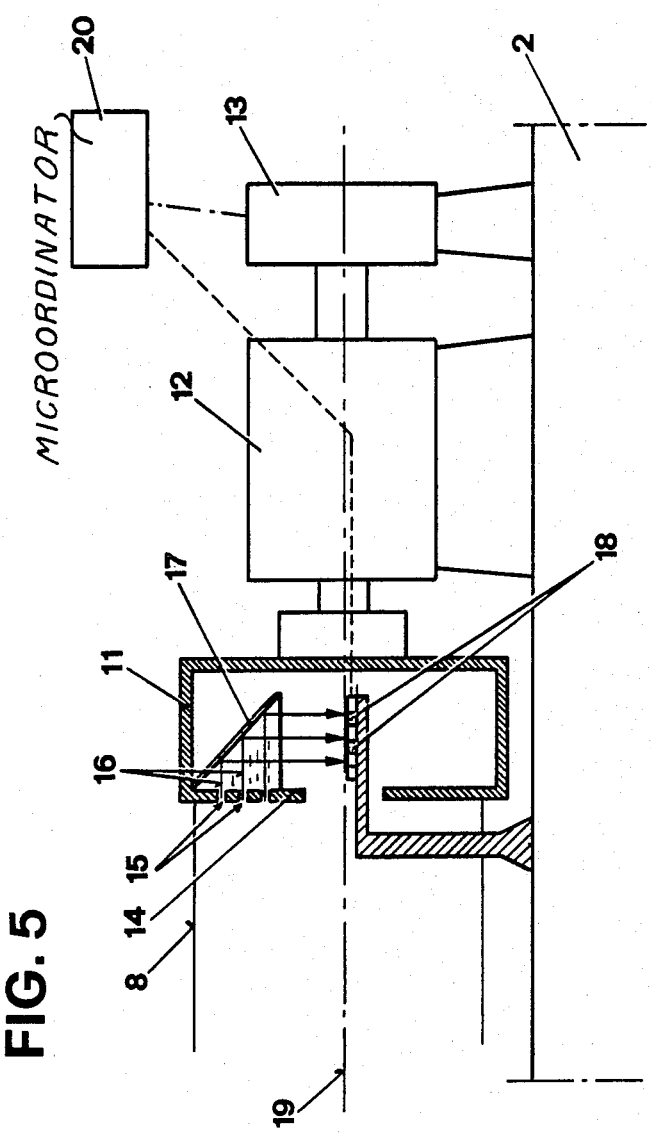
FIG. 5 is a longitudinal view, partly in section, of a detail of the image analyser of the arrangement shown in FIG. 2.

According to a first constructional form, such as shown diagrammatically in FIG. 2, the emitter 1 is composed of a laser diode 5, a collimating lens 6 disposed in front of the laser diode and permitting a homogeneous light beam to be obtained, and of an inverted telescope 7 transforming the homogeneous light beam into a parallel beam 8 of large diameter (for example, 60 millimetres) in conformity with the dimensions of the tool equipment and directed parallel to the bending axis of the workpiece to be bent. The shadow of the matrix 3, of the workpiece 9 which is to be bent and of the punch or die 10 (FIG. 3) is projected by the light beam 8 on to the receiver 4. As shown in FIG. 5, the receiver comprises an image analyser which consists, for example, of a box 11 driven in rotation by a motor 12 and fast with an angle coder 13 adapted to determine the angular position of the box 11. The various elements of the image analyser are arranged in such manner that the cover 14 of the box is disposed perpendicularly of the light beam 8. This cover has a plurality of holes 15 drilled therein. The rotating light beams 16 passing through the holes 15 are reflected by means of a prism 17 on to a system of fixed photodiodes 18, which are equal in number to that of the holes 15 and disposed on the axis of rotation 19 of the image analyser. The cover 14 of the box may have the form of a disc centred on the axis of rotation 19, parallel to the bending axis of the workpiece to be bent, the holes 15 being situated on a same radius.

In one form of the analyser, the number of holes 15 and of corresponding photodiodes 18 is twenty, but obviously it is sufficient to have two rotating light beams 16 and two corresponding photodiodes 18 in order to be able instantaneously to determine the bending angle. For each type of matrix, a suitable pair of photodiodes will be selected for the measurement.

Figure 4:
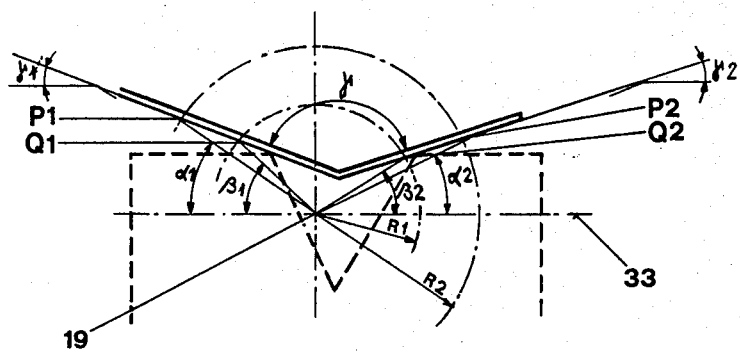
FIG. 4 is a diagrammatic view of the shadow range of the element to be bent on the image analyser.

By referring to FIG. 4, the instantaneous calculation of the bending angle of the workpiece to be bent can be carried out in the following manner: the radii R1 and R2 of the circles described by the rotating light beams 16 being known, it is readily possible to determine the position of the points P1, Q1 and P2, Q2, of which the respective angular positions $\alpha 1$, $\beta 1$ and $\alpha 2$, $\beta 2$ are set by the angle coder at the light-dark or dark-light passage of the selected photodiodes, with respect to the reference plane 33 of the angle coder. A microordinator 20 then makes it possible to determine, with the aid of known formulae, the angles γ1 and γ2, which form the faces of the workpiece 9 to be bent with the reference plane of the matrix and, consequently, the instantaneous bending angle γ of the workpiece to be bent. The microordinator continuously compares the instantaneous bending angle with the imposed bending angle and controls the descent of the punch.

Moreover, the position of the punch 10 being known, the device as described above is arranged so as to function as a safety device with the descent of the punch, before the initiation of the bending of the workpiece to be bent. Actually, when the punch is disposed above a circle of specific radius corresponding to a specific photodiode, it is easy to control, by means of the microordinator, that no shadow is detected above the upper plane of the workpiece to be bent by the photodiodes corresponding to the rotating light beams and describing circles of radii smaller than the established radius. When a shadow is detected, the descent of the punch is immediately stopped.

Since the device as described above permits the instantaneous bending angle to be determined at any moment during the bending, it is possible to determine the extent of the elastic return of the workpiece, corresponding to a partial unbending of the said workpiece when the punch is withdrawn, after the desired bending angle has been reached. The arrangement is such that there is automatic compensation for this bending. After the unbending, the microordinator controls the progression of the descent of the punch until there is obtained the calculated bending angle, which is a function of the desired bending angle and of the measured unbending angle.

The said device also permits the determination in a precise manner of the thickness of the element to be bent by the analysis of the projected shadow of the profile of the element to be bent at the commencement of the bending operation.

Under the stresses due to the bending, the press is deformed and produces a variation of the bending angle along the element to be bent. The result thereof is a variation of the thickness of the projected shadow of the profile of the workpiece, which is taken into consideration by the microordinator, so as automatically to curve or bend the lower table and/or the upper table by means which are known per se, by acting, for example, on jacks placed beneath the lower table of the press, until there is obtained a constant thickness of the projected shadow of the element to be bent.

Figure 6:
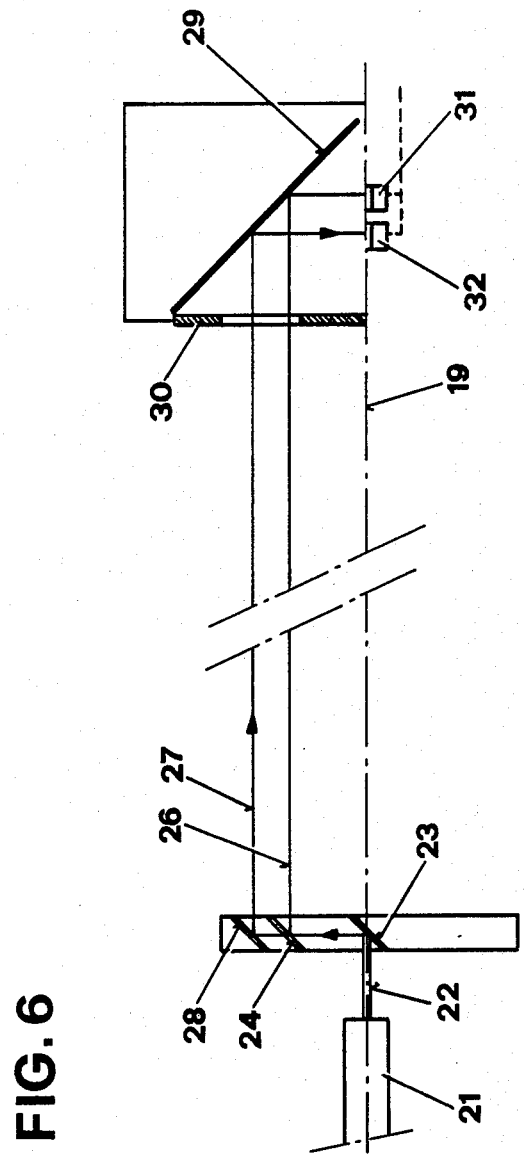
FIG. 6 is a diagrammatic longitudinal view of a second embodiment of the device according to the invention.

According to a second modified form of the arrangement which is shown in FIG. 6, the two turning or rotating light beams necessary for determining the instantaneous bending angle of the workpiece to be bent are produced by means of a laser diode 21, emitting a laser beam 22 of small diameter, parallel to the axis of the workpiece, for example, to the plane of the matrix, this beam being deviated by 90° from its axis by a first mirror 23 disposed on the axis of the beam and inclined at 45°, the deviated beam being then divided into two beams by a second mirror 24 which is semi-transparent and inclined at 45°, so that the first deviated beam 26 is parallel to the beam 22, the second beam, in its turn, being deviated by a third mirror 28 parallel to the second mirror 24. Obtained in this manner are two beams 26 and 27 parallel to the axis of the laser beam, and hence to the reference plane of the matrix. The three mirrors 23, 24 and 28 are mounted on a plate driven in rotation by a motor turning at a constant speed. This plate is arranged with the laser diode, for example at one of the ends of the lower table of the press. According to this modified constructional form, the receiver disposed at the other end of the lower table of the press comprises a screen 30 and a conical mirror 29 intended for deviating the beams 26 and 27 on to two photodiodes 31 and 32 or a mirror turning in synchronism with the mirrors 23, 24 and 28. The determination of the instantaneous bending angle can be carried out in the same manner as described above.

According to a third embodiment (not shown), the two rotating light beams of FIG. 6 can be produced with the aid of two emitter diodes disposed on a support which is driven in rotation by a motor, the axis of rotation of the support being parallel to the bending axis of the workpiece to be bent.

In accordance with another modified constructional form (not shown), the emitter is so arranged as to produce a parallel light beam of large diameter and of the type such as that of FIG. 2, the shadow of this beam received by the element to be bent and the tooling being projected on to an electronic image receiver and analysed by a microordinator.

The emission and reception means as described above may be mounted fast with the lower table 2 or the matrix 3, the bending axis of the element to be bent being parallel to the edges of the V of the matrix. These means may be mounted fast with the upper table 34 or with the punch 10, the bending axis of the element to be bent being then parallel to the lower edge of the punch. It is obvious that these emission and reception means may also be fixed on the base or the support of the press.

The device according to the invention permits an instantaneous measurement of the very precise bending angle to be obtained, provided that the axis of the optical beam is strictly parallel to the bending axis of the element to be bent. This strict parallelism is obtained, for example, by means of micrometer screws acting on the light source and disposed at right-angles to a pivot, so that the adjustment of one has no influence on the adjustment of the other. The detection of the correct direction of the beam can be effected by means of an adjustable field objective of small diameter, for example 1 centimeter, fast with the light source and disposed in the light beam or possibly at the side of the latter, behind a second independent light source parallel to the first. The adjustable field objective is regulated in such manner that the part of the light beam which intercepts it is focused on photoelectric cell having four quadrants, disposed at a certain distance from the objective and fast with reception means. This adjustment device is arranged in such manner that when four signals of equal value are obtained on the four quadrants of the photoelectric cell, a beam strictly parallel to the bending axis of the element to be bent is obtained by manual or automatic action on the micrometer screws.

What is claimed is:

1. An optical light beam device for automatically controlling the bending operation when bending a workpiece with a press brake, the press brake comprising a punch and a matrix, the bending producing a linear bending axis of the workpiece, the device comprising:

emission means including at least one lighting source and mounted on one side of the press, including opto-mechanical means for producing at least one rotating light beam directed parallel to the bending axis of the workpiece to be bent and producing a projected shadow of the profile of the workpiece and of the tooling equipment on a reception means mounted on the other side of the press for analyzing the projected shadow of the profile of the workpiece and of the tooling equipment, and for determining the instantaneous bending angle of said workpiece.

2. A device according to claim 1, wherein the emission means comprise an optical means for producing a large-diameter light beam, the opto-mechanical means comprise a screen driven in rotation and drilled with at least one hole for the formation of a rotating light beam, and the reception means comprise at least one receiving diode.

3. A device according to claim 1, wherein the emission means comprise means for emitting a laser ray, of which the beam, parallel to the bending axis of the workpiece, is deflected by a first mirror, and then by a second mirror which is semitransparent and is disposed parallel to a third mirror, the second and third mirrors being so arranged that the laser beams is split into two parallel beams, the three mirrors being fast with a plate driven in rotation by a rotating motor.

4. A device according to claim 1, wherein the emission means comprise at least one emitting diode arranged on a support far being set in rotation by a motor about an axis parallel to the bending axis of the workpiece, the diode producing a light beam parallel to the said axis.

5. A device according to claim 2, wherein the light source is disposed at one end of the press, the screen being disposed at the other end of the press and being driven in rotation by a motor, at least one deflection means, fast with the screen-motor assembly, for deflecting the rotating light beam on to the receiving diode connected to a microcoordinator, the microcoordinator being connected to an angle coder, fast with the motor, and to the means for controlling the bending movement of the press.

6. A device according to claim 5, wherein the screening means is drilled with a plurality of holes and constitutes the cover of a box or housing, the deflecting means being contained within the said housing, so as to deflect the plurality of rotating beams on to a system of photodiodes arranged on an axis coincident with the axis of rotation of the motor.

7. A device according to claim 3, wherein the receiving means comprise a device for deflecting the rotating beams on to at least one receiving diode disposed on the axis of rotation of tbe motor and connected to a microordinator, the latter being connected to an angle coder fast with the motor and to means for bending movement control of the press.

8. A device according to claim 4, wherein the receiving means comprise a device for deflecting the rotating beams on to at least one receiving diode disposed on the axis of rotation of the motor and connected to a microordinator, the latter being connected to an angle coder fast with the motor and to means for bending movement control of the press.

9. A device according to one of the claims 5, 6, 7 or 8, wherein the microordinator is programmed so as to analyse the projected shadow of the profile of the workpiece to be bent and of the tooling equipment, so as to determine, during the bending operation, the thickness of the workpiece, the instantaneous bending angle of the said workpiece, the variation in the thickness of the projected shadow of the profile of the workpiece caused by the deformation of the lower and upper tables of the press under the forces due to the bending and to give the order for automatically compensating for this deformation, and the elastic return of the workpiece, and to detect any suspect shadow appearing in the field of the beam when the punch is located above a safety position.

10. A device according to one of the claims 1–8, further comprising a means for regulating the direction of the light beam, formed by at least two micrometer screws fast with the lighting source and arranged so as to modify the direction of the beam and an adjustable field objective, which is traversed by a light beam and is so arranged as to permit the focusing of the light beam passing through it on a receiving means having four quadrants and fast with the receiving means.

* * * * *